US009855699B2

(12) United States Patent
Wostmann et al.

(10) Patent No.: US 9,855,699 B2
(45) Date of Patent: Jan. 2, 2018

(54) FILTERING DEVICE FOR HIGHLY VISCOUS MEDIA

(75) Inventors: Stefan Wostmann, Sassenberg (DE); Frank Hartmann, Steinfurt (DE); Robert Middler, Havixbeck (DE)

(73) Assignee: Nordson Holdings S.A.R.L. & Co. KG, Erkrath (DE)

( * ) Notice: Subject to any disclaimer, the term of this patent is extended or adjusted under 35 U.S.C. 154(b) by 209 days.

(21) Appl. No.: 13/700,755

(22) PCT Filed: Jun. 1, 2011

(86) PCT No.: PCT/EP2011/059110
§ 371 (c)(1),
(2), (4) Date: Nov. 29, 2012

(87) PCT Pub. No.: WO2011/151398
PCT Pub. Date: Dec. 8, 2011

(65) Prior Publication Data
US 2013/0087498 A1    Apr. 11, 2013

(30) Foreign Application Priority Data

Jun. 1, 2010 (DE) .................. 10 2010 029 591

(51) Int. Cl.
*B29C 47/00* (2006.01)
*B29C 47/68* (2006.01)

(52) U.S. Cl.
CPC ............ *B29C 47/68* (2013.01); *B29C 47/682* (2013.01); *B29C 47/0009* (2013.01)

(58) Field of Classification Search
None
See application file for complete search history.

(56) References Cited

U.S. PATENT DOCUMENTS 4,701,118 A * 10/1987 Koching et al. ............... 425/185
5,125,823 A *  6/1992 Kreyenborg .................. 425/185
(Continued)

FOREIGN PATENT DOCUMENTS

CN    2340601 Y    9/1999
DE    4012404 C1   2/1991
(Continued)

OTHER PUBLICATIONS

International Patent Application No. PCT/EP2011/059110, Written Opinion dated Jul. 26, 2011, 11 pp. (6 pages English Translation).
(Continued)

*Primary Examiner* — Benjamin M Kurtz
(74) *Attorney, Agent, or Firm* — Baker & Hostetler LLP (57) ABSTRACT

A filtering device (100) for highly viscous media comprises at least one screen plug (10) which is movably arranged in a screen plug bore (27) of a housing (20) and which has at least one screen cavity (11, 12), a filter element (11.7) lying in said screen cavity. The screen cavity (11, 12) narrows to a funnel section (11.6) in a rear region when viewed in the flow direction, said funnel section opening into at least one screen plug outlet channel that opens upstream of the housing outlet channel (24, 25) in the production position. According to the invention, the screen plug outlet channel comprises an inlet zone (11.1, 11.2), at least one deflecting point (11.3), and an outlet zone (11.2, 12.2). The intake zone (11.1, 12.1) extends from an edge region of the funnel section (11.6), and the outlet zone (11.2, 12.2) is designed as a groove that extends on the outer face of the screen plug (10, 10') and/or on the inner face of the screen plug bore (27).

13 Claims, 9 Drawing Sheets (56) References Cited

U.S. PATENT DOCUMENTS

| | | | |
|---|---|---|---|
| 5,922,194 A | 7/1999 | Bruckmann et al. | |
| 6,641,728 B2 | 11/2003 | Emhardt | |
| 7,530,463 B2 * | 5/2009 | Bacher et al. | 210/427 |
| 2005/0016914 A1 | 1/2005 | Middler et al. | |
| 2008/0197061 A1 * | 8/2008 | Woestmann | 210/108 |

FOREIGN PATENT DOCUMENTS

| | | |
|---|---|---|
| DE | 4126261 C1 | 7/1992 |
| DE | 10116408 C1 | 11/2002 |
| DE | 10254022 A1 | 3/2004 |
| DE | 20319832 U1 | 5/2004 |
| DE | 10317170 A1 | 9/2004 |
| JP | H11505778 | 5/1999 |
| JP | 2009160935 A | 7/2009 |
| WO | 2004026432 A1 | 4/2004 |
| WO | 2005084917 A1 | 9/2005 |

OTHER PUBLICATIONS

International Patent Application No. PCT/EP2011/059110, International Search Report dated Jul. 26, 2011, 5 pages (2 pages English Translation).

International Patent Application No. PCT/EP2011/059110, International Preliminary Report on Patentability dated Dec. 4, 2012, 13 pages (7 pages English Translation).

Japanese Application No. 2013-512923: Decision to Grant dated Feb. 8, 2016, 6 pages.

* cited by examiner

Fig. 8

FILTERING DEVICE FOR HIGHLY VISCOUS MEDIA

BACKGROUND OF THE INVENTION

The invention relates to a filtering device for highly viscous media.

Such filter devices are known from DE 102 54 022 A1 or DE 103 17 170 A1, for example. In particular, they have either two screen plugs each with a screen cavity or one screen plug having two screen cavities. As a result, it is possible to keep one of the screen cavities in production operation, while the other one is being cleaned. Such a filtering device therefore allows a continuous operation of an installation, in which a highly viscous medium, particularly a plastic melt, has to be cleaned.

Although the known filtering devices have proven useful, a partial material degradation can occur, particularly when filtering plastic melts, leading to the partial carbonization of the melt on the clean side of the screen, which causes defects precisely in the case of transparent plastics. These problems occur particularly if larger filter surface areas are required due to small installation throughputs, because the aim is to achieve a particularly fine filtration.

These degradation processes are explained by the fact that the medium to be filtered has to be kept hot in the filtering device, in order to keep the viscosity of the medium as low as possible, and thus be able to push the medium through the filter inserts at a relatively low pressure.

In the normal uninterrupted throughput at a defined flow rate, the influence of the temperature does not yet have a decomposing effect. However, the above-described defects can occur if, given certain rheological properties of the medium, flow zones form within the flow channels, in which zones the melt remains for a longer time and is exposed to the influence of the temperature.

The two known variants of continuous screen changers always require several and also larger flow canals which together have a relatively large volume, which in turn entails a lower flow rates or higher residence times of the medium.

Besides the considerations relating to flow technology, the manufacturing costs play a role. As a rule, continuously operating screen changers have two screen plugs each with one screen cavity. For this purpose, larger housings have to be provided, and two fittings between the housing bore and the screen plug have to be established. Moreover, two hydraulic units are required to shift the screen plug.

The problem of the present invention therefore is to reduce such residence zones, also referred to as dead water zones, in order to achieve the most consistent possible rinsing through of the entire volume area within the screen cavities, and to achieve a consistent residence time for all the current filaments of a flow through a screen plug. An additional problem is to allow a more cost effective construction of a continuously operated filtering device.

SUMMARY OF THE INVENTION

This problem is solved according to the present invention by a filtering device with the characteristics of claim 1.

It is essential for the invention that the inlet zone of the outlet channel is arranged off center on the clean side of a screen element in the screen cavity, in particular in an edge region of the narrowing funnel section, which extends in particular entirely up to the periphery of the screen cavity. As a result, a direction of flow is forced on the filtered medium which is such that it prevents turbulence in the melt or other medium in a lateral edge region, and thus the melt or other medium has a longer residence time in that area, in comparison to the central current filaments.

"Funnel-shaped," in the sense of the present invention, denotes not only the shape of a truncated cone, but rather it also includes other narrowing shapes that are suitable for channeling the fluid from a large cross-sectional surface area behind the filter element and lead it to the inlet zone of the channel.

Moreover, it is provided according to the invention that the outlet channel has an outlet zone which is designed as a groove that extends axially, and in particular:
  either only outside on the jacket of the particularly cylindrical screen plug
  or only in the wall of the screen plug bore
  or on both sides, so that partial grooves result, which complement each other in the production position of the screen plug to form a complete groove, and partially overlap in other positions.

Between the inlet zone, which is adjacent to the funnel section behind the screen cavity, and the groove-shaped outlet zone, a deflecting point is provided. The inlet and the outlet zones intersect in the area of a deflecting point, and enclose an angle between 30° and 90° there. Due to the forced sharp deflection, the mixing of the medium is further improved.

It is preferable to provide that the inlet zone of the screen plug outlet channel is triangular viewed in cross section. The triangular inlet zone is delimited by a first flank which is adjacent to the central tip of the funnel area and leads outward from there. This first flank extends preferably in the extension of the conical wall of the funnel area, so that, viewed in cross section, a seamless transition from the funnel area into the inlet zone of the screen plug outlet channel occurs. The other delimitation of the inlet zone is preferably formed by a second flank which is oriented in the throughflow direction and which is directly adjacent to the outer periphery of the screen element. This flank thus extends—again viewed in the cross section through the screen plug—nearly in the extension of the outer delimitation of the screen cavity. Here, only a slight offset is necessary in order to brace the screen element that has been inserted into the screen cavity.

The above descriptions relate to a cross section which is located in the plane of the center axis and at the same time also intersects the housing-side inlet and outlet bores.

In a cross-sectional plane that is transverse to the screen plugs and lengthwise through one of the screen cavities, the inlet zone has the appearance of a disk which is placed against the hollow conical funnel area of the screen cavity.

The described preferred embodiment of the inlet zone with the inclined flank has the following advantages in terms of flow technology:

Due to the offset arrangement of the outlet channel, at least of the area of the outlet channel extending up to the deflecting point, not only does the throughflow through the screen cavity occur in the housing throughflow direction, but a clear lateral swirl is also generated within the screen cavity, which counteracts the development of turbulence.

Due to the inclined flank, the area of wall adhesion of the melt is also increased. Indeed, as long as the effect of the wall adhesion on the flowing melt is strong enough, the flow remains laminar.

The construction according to the invention not only leads to an advantageous filtering device each with two screen plugs and one screen cavity, but it allows in particular the construction of a filtering device with only one screen plug and two screen cavities. As a result, considerable savings in manufacturing costs can be achieved. The construction with only one plug is made possible, on the one hand, by the groove-shaped outlet zone. Consequently, independently of the axial position of the screen plug, an area of said plug is always in connection with the housing outlet channel, that is to say also when a screen cavity has been removed from the housing for cleaning.

In order to be able to produce large filter surface areas, it is advantageous if two screen plugs that can be moved mutually independently in the housing are provided each with two pairs of screen cavities. The screen cavities of a pair are here arranged on facing sides of the screen plugs. In this manner, a filtering device having a total of eight screen cavities is produced.

In the filtering device according to the invention, it is also advantageous to use oval and other elongate shapes of filter elements, and accordingly to configure the screen cavities so that they are elongate. The flow guidance according to the invention promotes flow in the longitudinal extension of the screen cavity in the outlet zone. In contrast to the situation in the case of a central outflow from the screen cavity into the housing outlet channels according to the state of the art, in the design according to the invention there is no risk of formation of dead water zones in edge regions, even in screen cavities that extend over a great distance.

The flow deflection according to the invention has not only an advantageous effect in the normal operating position, but also precisely in the screen change position, because, in contrast to the known devices which provide several screen plug outlet channels for each screen cavity, of which only one remains operational in the screen change position, and in which the melt remains motionless in the other channel, in the filtering device according to the invention, owing to the fact that the outlet zone is always located before the housing outlet channel, no substantial reduction of the outlet-side flow cross section occurs and there is no negative change in the flow on the clean side of the screen.

BRIEF DESCRIPTION OF THE DRAWINGS

The invention is explained in further detail below in reference to the drawings. A detailed description of the figures follows.

DETAILED DESCRIPTION OF THE PREFERRED EMBODIMENTS

Figure 1:
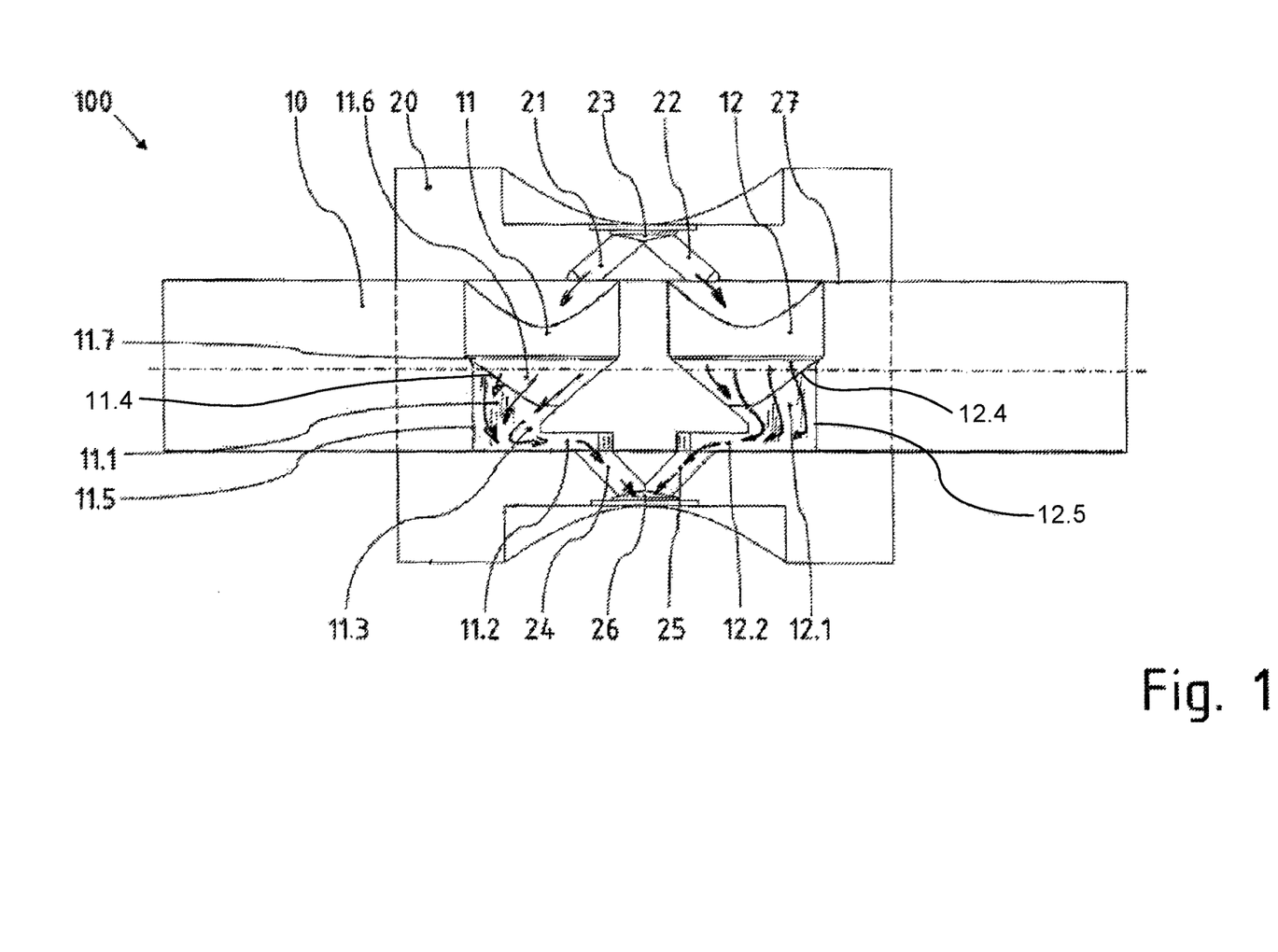
FIG. 1 shows a filtering device according to a first embodiment in cross section in the production position.

FIG. 1 shows a filtering device 100 which consists substantially of a housing 20 and a screen plug 10. The particularly cylindrical screen plug 10 is movably mounted in a screen plug bore 27 of the housing 20.

On the inlet side of the housing 20, an inlet opening 23 is provided, which branches into two housing inlet channels 21, 22. Each housing inlet channel 21, 22 is in connection with a screen cavity 13, 14 in the screen plug 10, when the screen plug 10 is in the production position depicted in FIG. 1.

On the other side of the housing 20, an outlet opening 26 is provided, at which the two housing outlet channels 24, 25 join. The housing outlet channels 24, 25 each are in connection with the clean side of the screen cavities 13, 14.

Within the screen cavities 13, 14, screen elements 13.1 are inserted. Behind the screen elements 13.1, viewed in the throughflow direction, the screen cavity 11 in each case narrows to a funnel area 11.6. Whereas in conventional filtering devices, a screen plug outlet channel usually starts directly from the tip of the funnel area 13.1, in the filtering device 100 according to the invention a screen plug outlet channel 11 is provided with an inlet area 11.1 which is directly adjacent to the funnel area 11.6.

The inlet zone 11.1 is delimited by a flank 11.4 which starts approximately from the tip of the conical funnel area 11.6 and from there extends over some distance toward a second flank 11.5. The second flank 11.5 extends approximately in the extension of the lateral delimitation of the screen cavity 11 and thus approximately parallel to the center axis of the screen cavity 11.

At a deflecting point 11.3, the screen plug outlet channel 11 is deflected by an angle of 90° or also less, and transitions into an outlet zone 11.2.

In the outlet zone 11.2, the screen plug outlet channel 11 then extends farther as a groove, which is preferably configured approximately in the shape of a keyway, and finally transitions into the housing outlet channel 24.

The same holds for the other screen cavity 12 on the right side of the filtering device 100 with a screen plug outlet channel 12 shown in FIG. 1, which also has an inlet zone 12.1, a deflecting point 12.3, and an outlet zone 12.2.

In the represented embodiment example, the outer flanks 11.5, 12.5 of the inlet zone 11.1, 12.1 extend in each case parallel to the direction of flow, and the inclined flanks 11.4, 12.4 extend from inside to outside in the represented embodiment example, wherein "inside" is defined as the center line which extends between the screen cavities 13, 14, and thus also, in the production position shown, centrally through the inlet opening 23 and the outlet opening 26.

Figure 2:
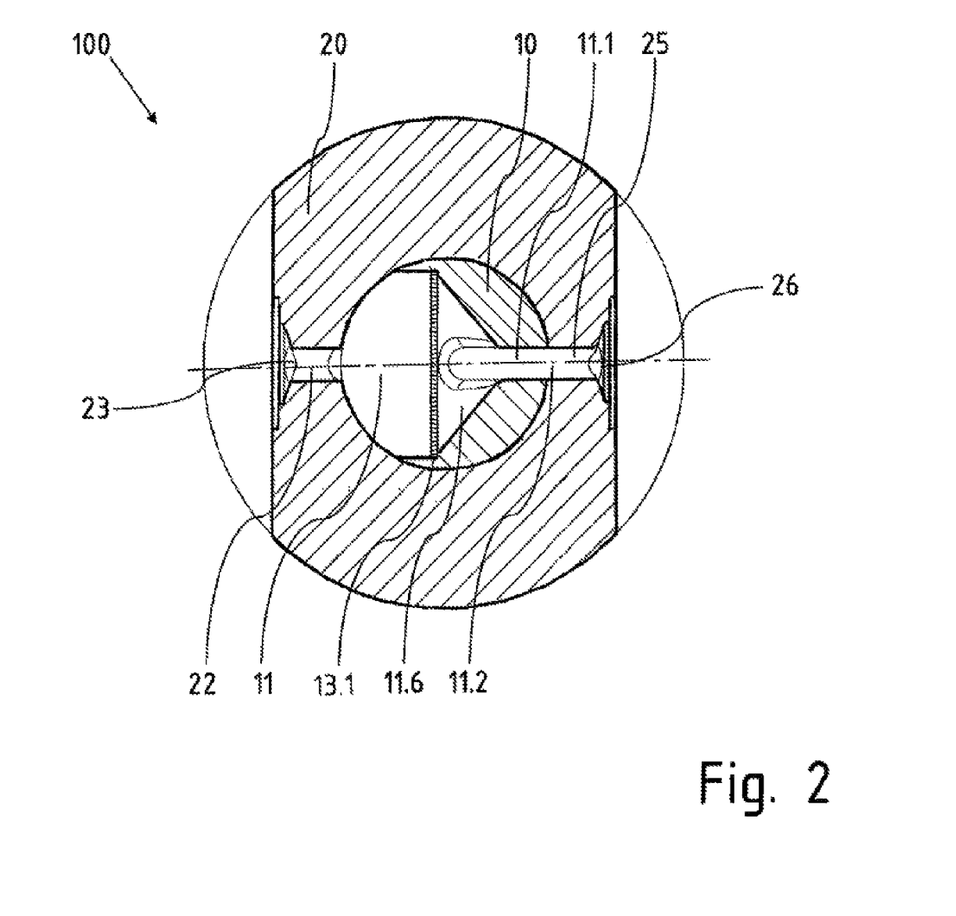
FIG. 2 shows the filtering device according to FIG. 1 in a cross-sectional plane offset by 90°.

Whereas in FIG. 1 the inlet zones 11.1, 12.1 have a triangular appearance, in a transverse cross-sectional plane through the screen plug 10, as represented in FIG. 2, they appear only as a thick disk which is adjacent to the funnel area 11.6.

The operation of the filtering device according to the invention is explained below:

During normal production operation according to FIG. 1, the two screen cavities 13, 14 are located before the inlet channels 21, 22. On the outlet side, the openings of the outlet zones 11.2, 12.2 are also located before the openings of the outlet channels 24, 25. The melt is able to flow uniformly through the two screen cavities 13, 14, and the flow distribution indicated by the arrows becomes established.

Figure 3:
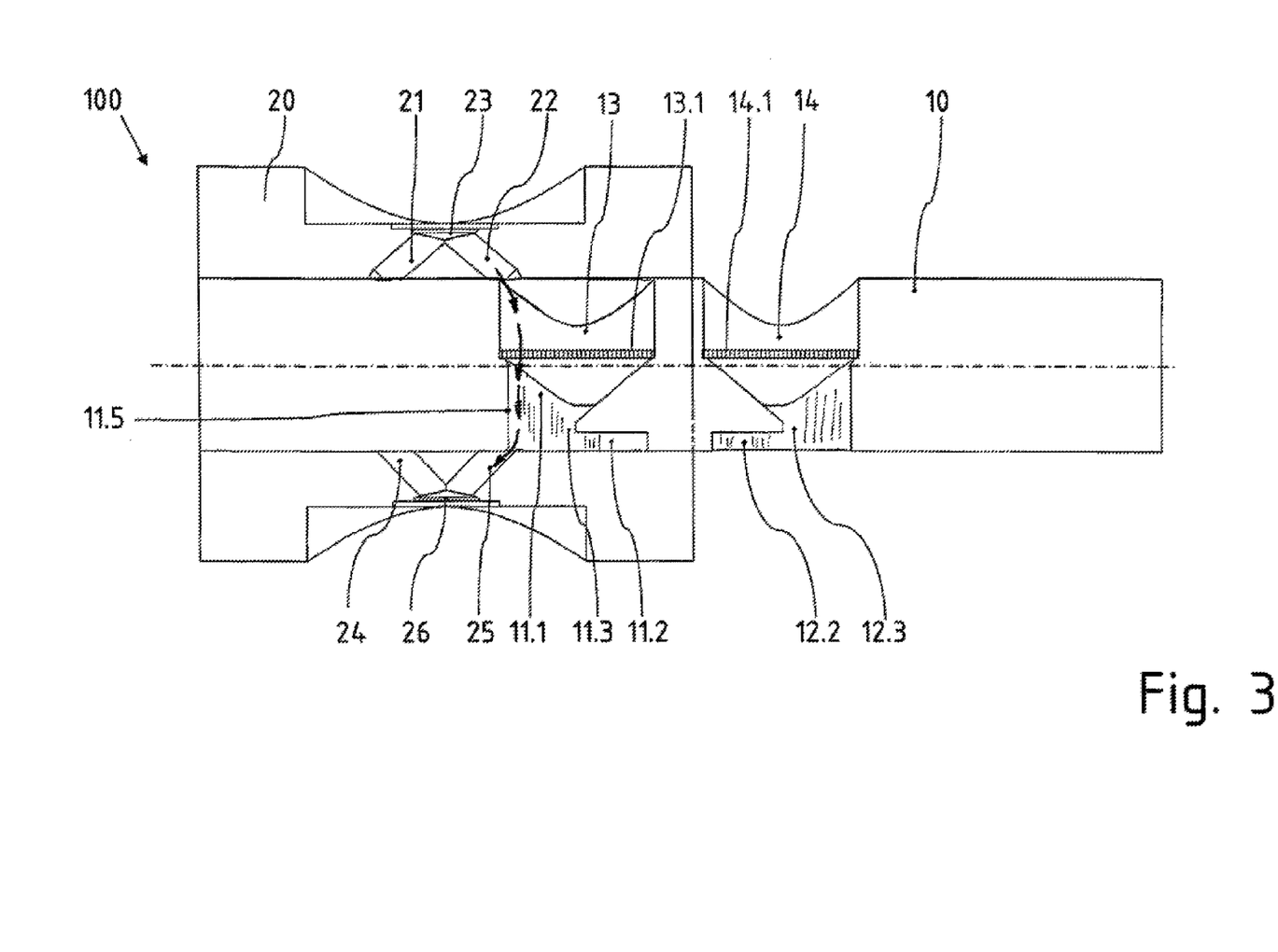
FIG. 3 shows the filtering device according to FIG. 1 in a screen change position from the top in cross section.

In the case of soiling of a screen cavity—as shown in FIG. 3—the screen plug 10 can be withdrawn from the housing 20 until one of the screen cavities 14 is in a position that is freely accessible outside of the housing 20. There, the screen cavity 14 including the outlet zone 12.2 can be cleaned without effort. The screen element 12.7 is also freely accessible, so it can be taken out and replaced.

In the mean time, the melt, as before, is able to flow through the housing inlet channel 22 into the screen cavity 13, and from there it can flow off again through the housing outlet channel 25, so that the production operation does not have to be interrupted.

Figure 4:
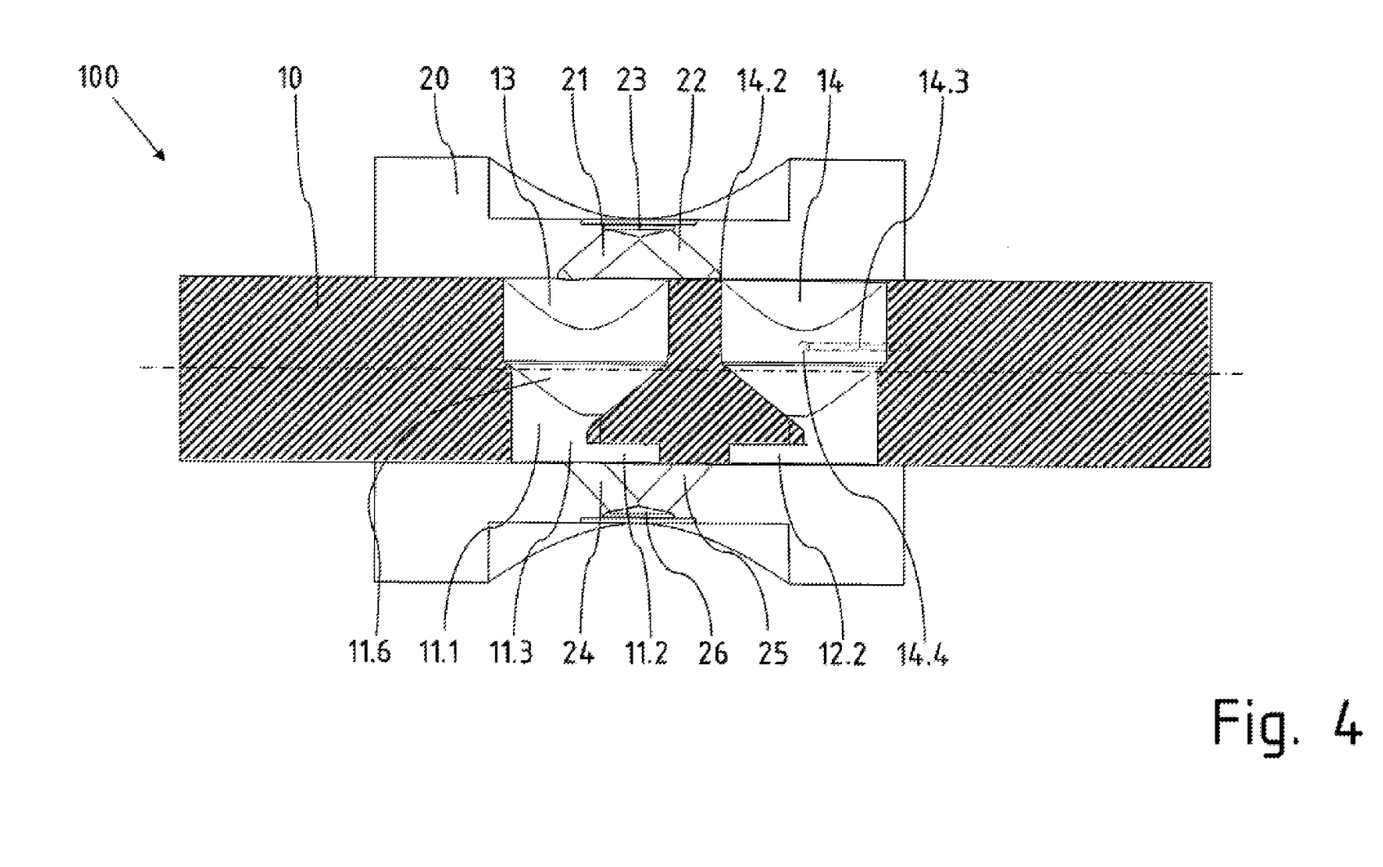
FIG. 4 shows the filtering device according to FIGS. 1-3 in the ventilation position from the top in cross section.

After the screen cavity 12 has been cleaned and optionally provided with a new screen insert, the screen plug 10 is again moved back into the housing 20, but at first not yet into the production position according to FIG. 1, but rather into a position shown in FIG. 4, in which a gradual filling of the previously cleaned screen cavity 12 with the melt and simultaneous ventilation of the screen cavity 12 occur.

In this position, the screen cavity 14 is in connection with the housing inlet channel 22 only by a very small connection site 14.2, so that only a greatly slowed melt flow into the screen cavity 14 is possible. Consequently, the melt can accumulate in the screen cavity 14 and displace the air contained therein.

In the upper area of the screen plug, a ventilation groove 14.3 is provided. In fact, said ventilation groove is not located, as indicated here, in the cross-sectional plane through the center axis, but above said plane, on the cylindrical jacket of the screen plug. Therefore, it is indicated in FIG. 4 only by the dashdotted line. Rising air can flow out of the bore 14.4, and it reaches the groove 14.3 which extends outside of the housing edge of the housing 20, so that air can escape there.

After the preflooding of the screen cavity 12 and the ventilation, the screen plug 10 is then moved back into the production position shown in FIG. 1. The groove 14.3 is then located again entirely within the housing 20, and it is thus sealed off in the housing bore 27.

Figure 5:
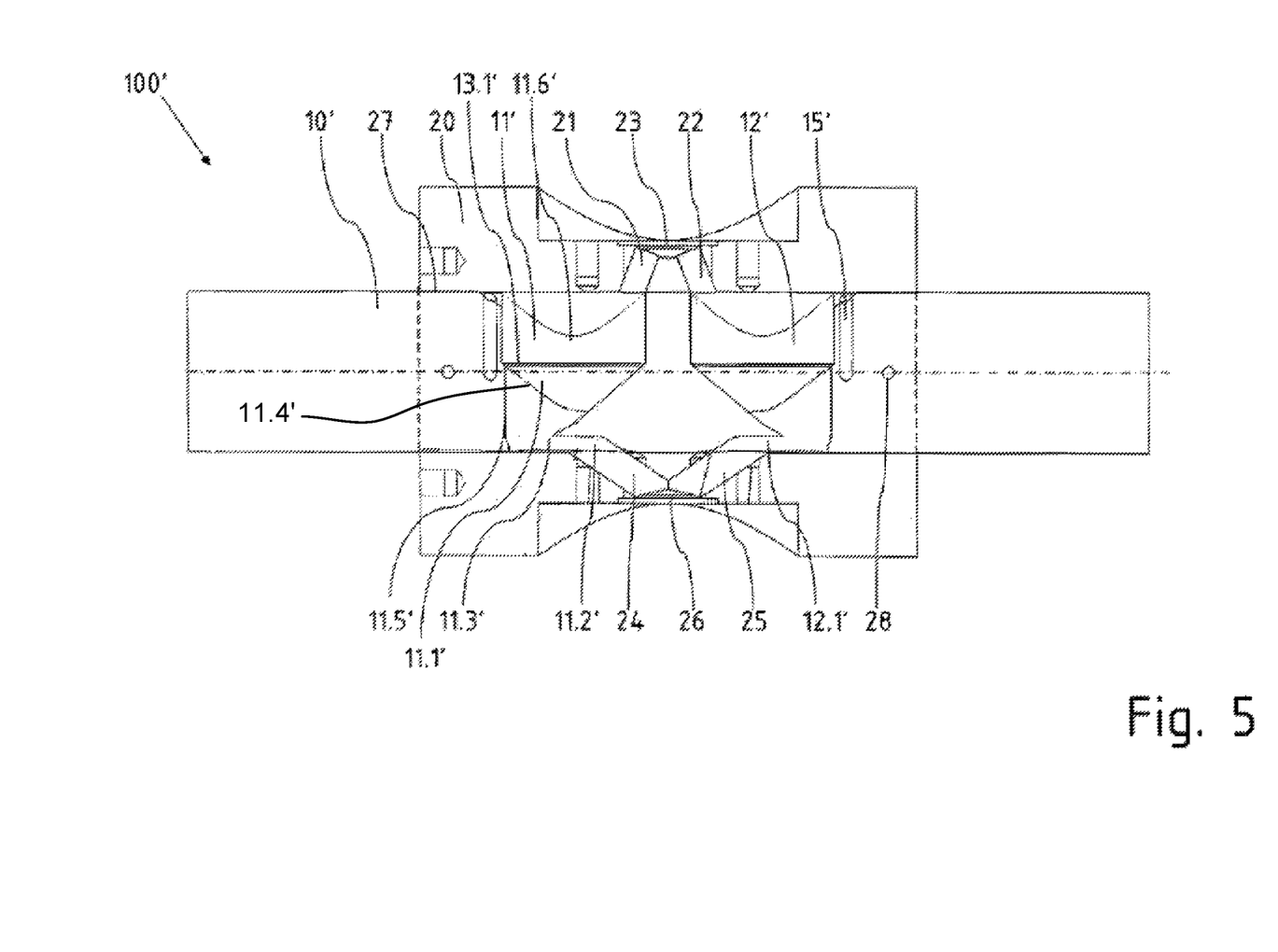
FIG. 5 shows a filtering device according to a second embodiment in the production position from the top in cross section.
Figure 6:
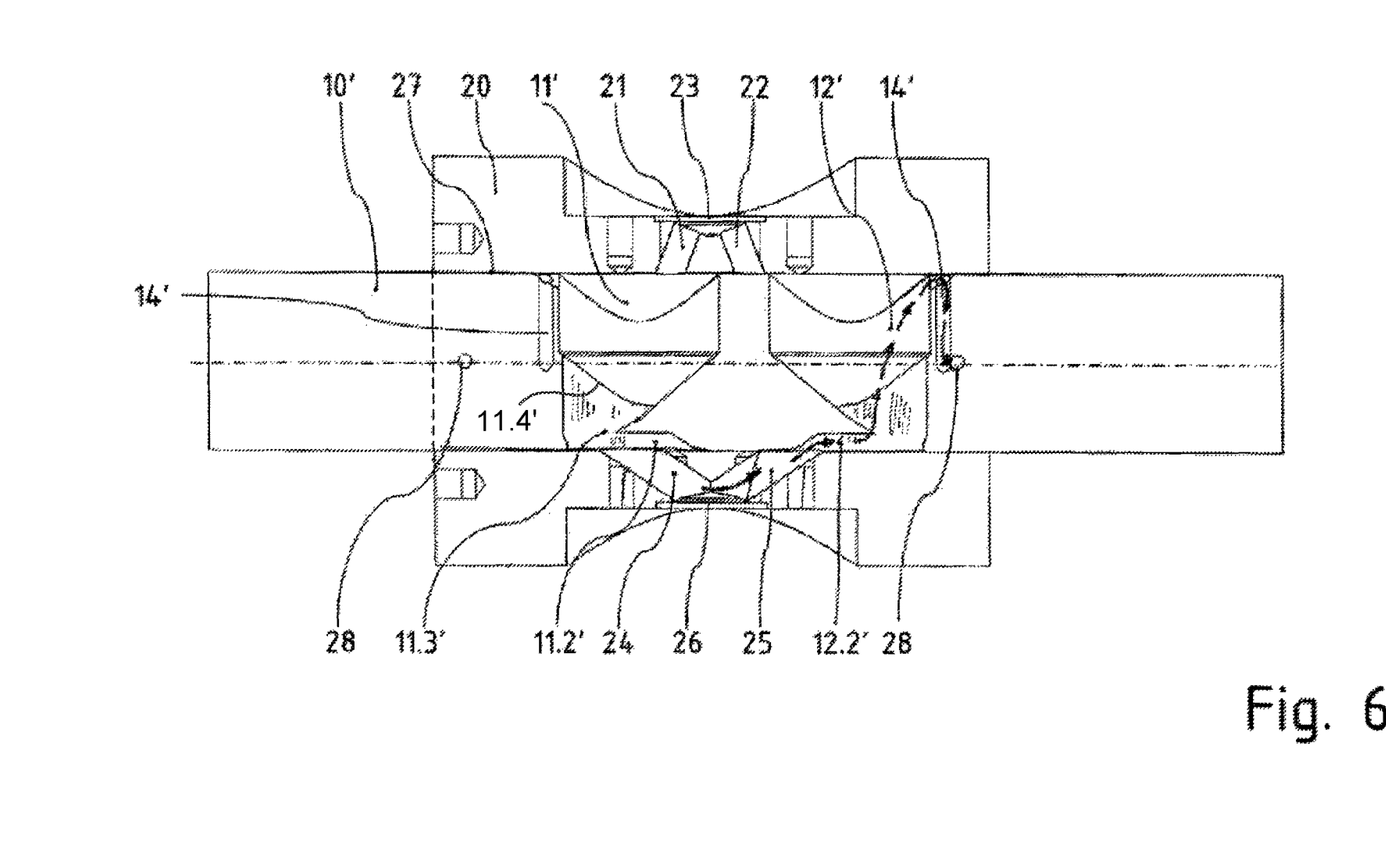
FIG. 6 shows the filtering device according to FIG. 5 in the backwash position from the top in cross section.

In FIG. 5, an additional embodiment of a filtering device 100' is represented. The housing design of the housing 20 corresponds to the above-described embodiment. Additional backwash bores 28 are provided only beneath the screen plug 10'.

The screen plug 10' is also largely similar to the screen plug 10 of the first embodiment. The design, which is essential for the invention, of the screen plug outlet channel with an inlet zone 11.1' and an outlet zone 11.2' corresponds to that of the first embodiment.

The difference is that, besides the screen cavities 13', 14', a backwash opening 15' is provided in each case, which has to be brought to correspond with the backwash bores 28 in the housing 20.

In the position shown in FIG. 5, a normal production operation occurs. The two screen cavities 13', 14' are supplied through the housing inlet channels 21, 22.

From the production position according to FIG. 5, the screen plug 10' can be moved sideways out of the housing 20, so that one of the screen cavities, in this case the right screen cavity 14', is completely cut off from the housing inlet channels 21, 22. The melt can now flow through the left screen cavity 13 and the screen plug outlet channel 11 thereof into the inlet channel 24, and then again through the outlet channel 25 into the right screen cavity 14', because there is no longer any pressure applied to the soiled side of the screen cavity 14'.

Instead, in this position, there is a connection to the backwash bore 15' on the soiled side of the screen cavity 14'. The melt can flow through said connection to the backwash bore 28 in the housing, and from there it reaches the outer side of the housing 20. Coarse soiling particles that adhere to the soiled side of the screen element 13.1 can be detached by backwashing in a manner which in itself is known.

In the second embodiment of a filtering device 100', the screen plug 10' can be moved even farther out of the housing 20, so that a screen replacement analogous to the position in FIG. 3 is possible. Similarly, a ventilation and preflooding of the clean screen cavity is possible analogously to the procedure described in FIG. 4.

Figure 7A:
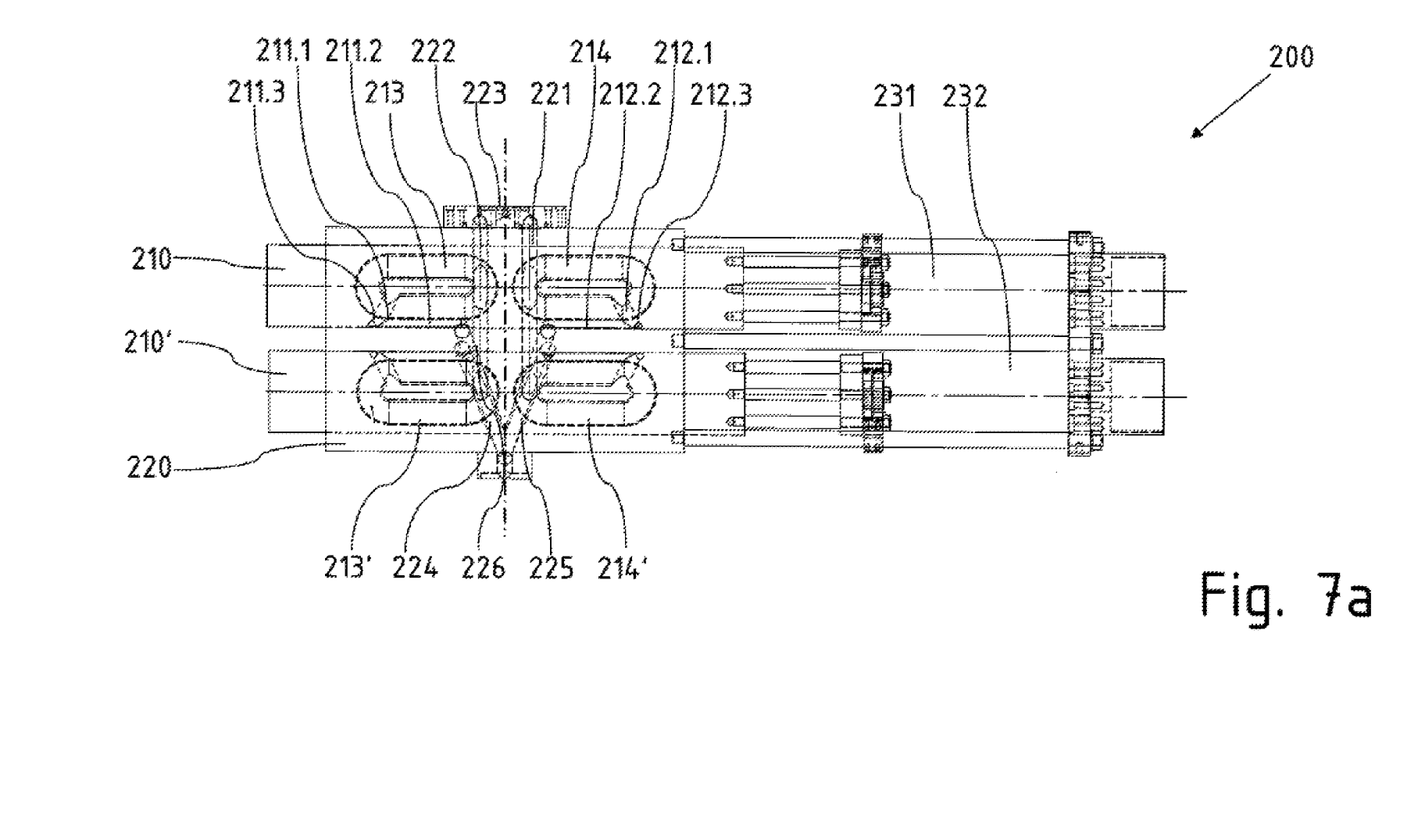
FIG. 7a shows a filtering device according to a third embodiment in the production position in a side view.
Figure 7B:
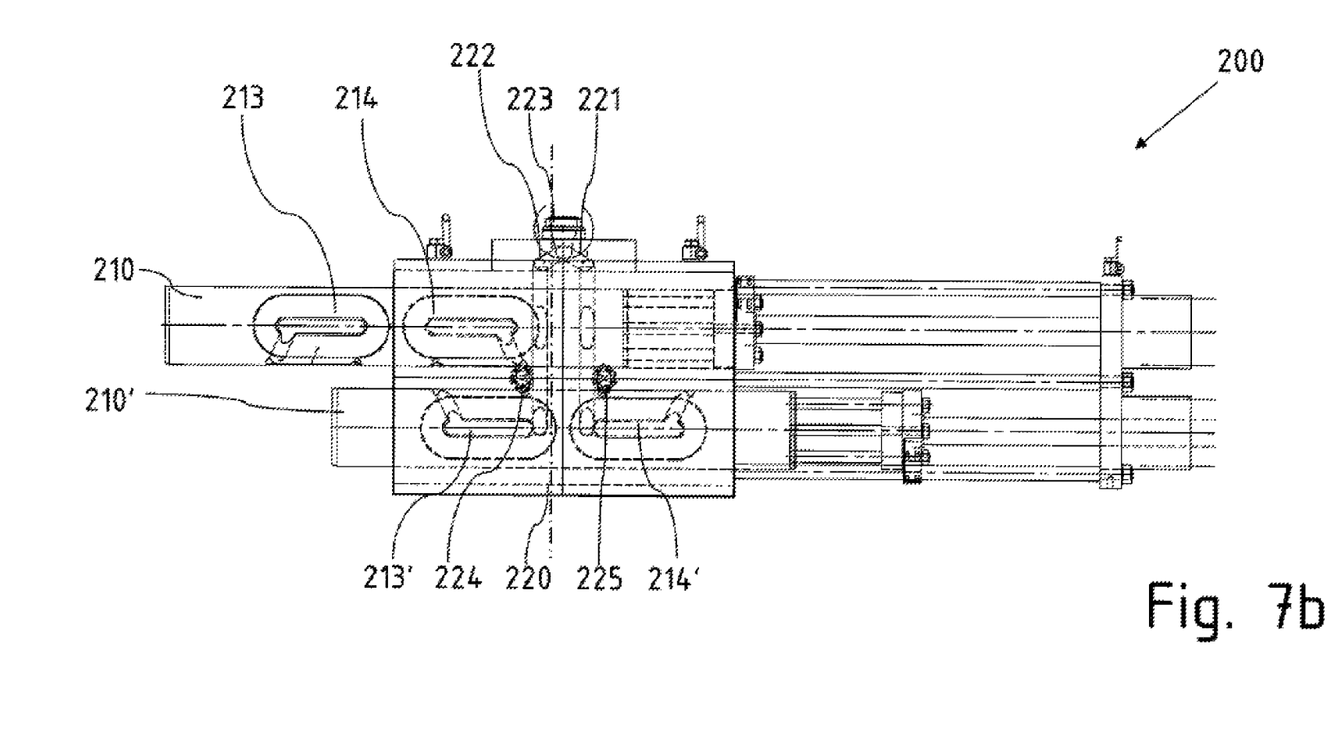
FIG. 7b shows a filtering device according to the third embodiment in the screen change position in a side view.
Figure 8:
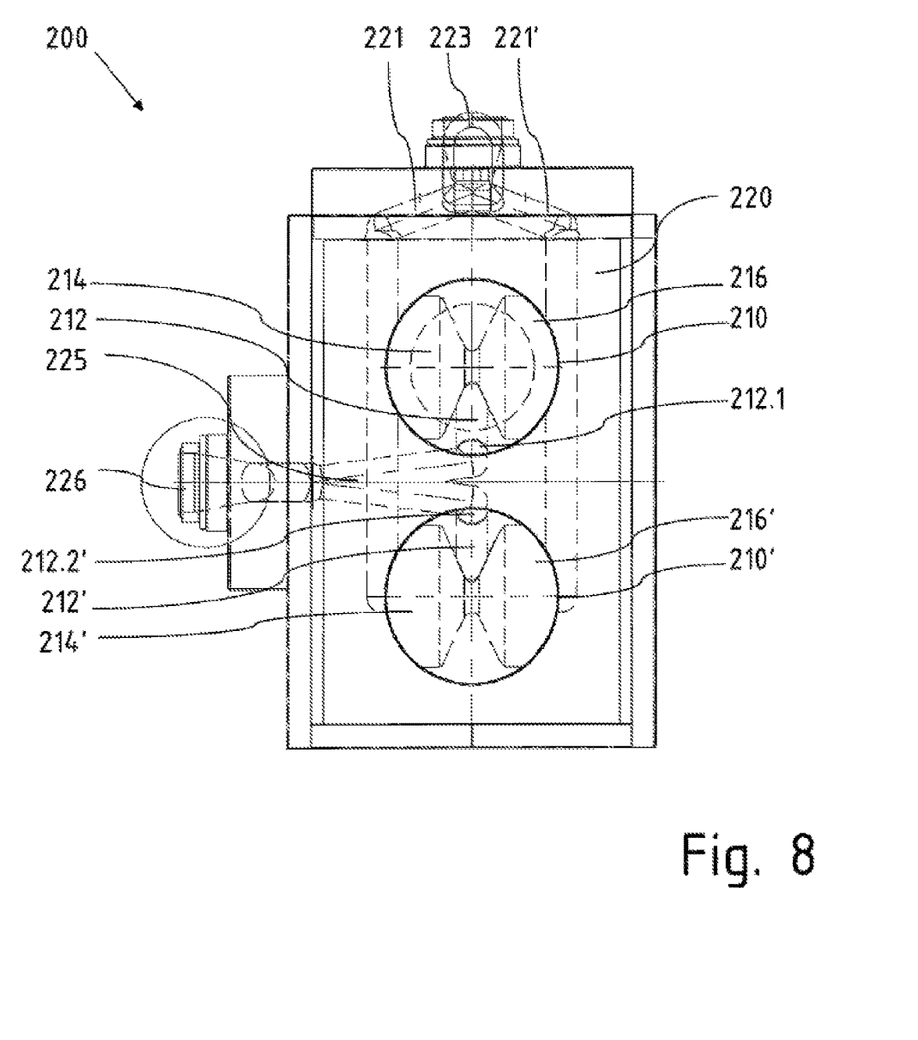
FIG. 8 shows the filtering device according to the third embodiment in cross section.

A third embodiment of a filtering device 200 is represented in FIGS. 7a, 7b and 8. It comprises two identical screen plugs 210, 210', which can be shifted independently of each other via the hydraulic cylinders 231, 232 in a housing 220.

Each screen plug 210, 210' has, as can be seen in FIGS. 7a and 7b, two screen cavities 213, 214, 213', 214' next to each other and, moreover, as can be seen again in the cross section according to FIG. 8, again the same number of screen cavities on the rear side, so that the filtering device 200 has a total of eight screen cavities.

In FIG. 7a, the production position is shown in a side view on the filtering device 200, in which the two screen plugs 210, 210' are positioned in such a manner that there is flow through all the screen cavities 213, 214, 213', 214'.

The fluid flows through an inlet opening 223 at the top in the housing into housing inlet channels 221, 222 that branch off from said housing, into the screen cavities 213, 214, 213'. 214', each of which has at least one filter element that is not shown here.

In the flow direction behind the filter elements, in each case—as also in the embodiments according to FIGS. 1-6—a funnel area is present, in which the fluid collects, and is led to an inlet zone 211.1, 212.1 of a screen plug outlet channel 211, 212 which starts in an edge region of the given screen cavity 213, 214, 213'. 214'. Adjacent to this there is in each case, in the screen plug outlet channel 211, 212, a deflecting point 211.3, 212.3, wherein a transition into the outlet zone 211.2, 212.2 occurs. The latter extends parallel to the center axis of the screen plugs 210, 210', until they open into the V-shaped mutually separated housing outlet channels 224, 225. The housing outlet channels 224, 225 lead to a common outlet opening 226 at the bottom on the housing 220.

FIG. 7b shows a situation in which the upper screen plug 210 is in a so-called screen replacement position. Here, the screen cavity 213 which is visible on the left outside and the associated screen cavity of the same pair are positioned on the rearward side of the screen plug 210 outside of the housing 220. The screen cavities 213 can be cleaned, and the filter elements contained therein can be removed. The right screen cavity 214, on the other hand, has a connection to the left housing outlet channel 224 and can thus continue to be fully used.

FIG. 8 shows a cross section along the dashdotted line in FIG. 7a, which extends through the inlet and the outlet openings 223, 226.

The screen cavities 214, 214' which are visible in FIGS. 7a and 7b from the side have, on the other side of the screen plugs 210, 210', counterpieces in the form of screen cavities 216, 216'.

The broken lines indicate the course of the housing inlet channels 221, 221' and the housing outlet channels 225. In order to be able to supply a total of eight screen cavities of the filtering device 200, four vertical housing inlet channels 221, 221' are provided, which first branch away from the inlet opening 223, and then lead downward on both sides of the screen plugs 210, 210', wherein they tangentially intersect the screen cavities 214, 216, 214', 216'. At the same time, four housing outlet channels 225 are provided, which branch off in the longitudinal direction from an outlet opening 226 (see FIG. 7a, 7b) or open into said opening, and which also strut apart height-wise (see FIG. 8) in such a manner that they cut the upper screen plugs 210 at the bottom and the bottom screen plugs 210' at the top.

In this representation, one can clearly see the groove-shaped outlet zones 212.2, 212.2', which are in connection with the housing outlet channels 225.

The invention claimed is:

1. A filtering device for a flow of highly viscous media, said filtering device comprising:
    a housing comprising:
        a screen plug bore;
        an inlet opening; and
        an outlet opening;
    a screen plug having a screen cavity, said screen plug disposed displaceably in said screen plug bore between said inlet opening and said outlet opening, said screen plug having:
        a filter element having a dirty side and a clean side, said filter element disposed in said screen cavity; and
    said screen cavity comprising:
        a funnel section adjacent said clean side of said filter element, said funnel section having an inlet end and an outlet end, said inlet end being larger than said outlet end, said funnel section having an edge region that narrows from said inlet end, along a through flow direction of said screen cavity, to said outlet end; and
        a screen plug outlet channel comprising an inlet zone, a deflection point, and an outlet zone that opens into said outlet opening of said housing,
    said funnel section opening to said inlet zone at said outlet end of said funnel section, said inlet zone elongated along said edge region of said funnel section, and said outlet zone is configured as an elongated axial groove extending on an outer surface of said screen plug, wherein said inlet zone and said outlet zone of said screen plug outlet channel are configured to convert the highly viscous media flow from a substantially radial flow direction at said deflection point to a substantially axial flow direction along said elongated axial groove of said outlet zone before exiting into said housing, wherein said deflection point is between said outlet zone and said inlet zone,
    wherein said elongated axial groove is defined on its radially-inner side by a surface substantially parallel to a center axis of said screen plug, and
    wherein said inlet zone is triangular, viewed in a cross section perpendicular to the center axis of said screen plug, and delimited by a first central flank, oriented transversely to the through flow direction, and by a second flank that is oriented in the through flow direction and that is located at an outer periphery of said inlet zone.

2. The filtering device according to claim 1, wherein said inlet zone is located upstream of said deflecting point, and said outlet zone is located downstream of said deflecting point, said inlet zone and said outlet zone together enclose an angle of 90° or less.

3. The filtering device according to claim 1, wherein said first central flank and said outlet zone enclose an angle of 30-60°.

4. The filtering device according to claim 1, wherein said screen plug extends along a center axis, and said outlet zone is configured as said groove and extends on said outer surface of said screen plug, and said groove is parallel to the center axis.

5. The filtering device according to claim 1, further comprising a second screen plug, each of said screen plugs arranged in said housing so as to be independently movable relative to said housing.

6. The filtering device according to claim 5, wherein each of said screen plugs comprises two screen cavities.

7. The filtering device according to claim 5, wherein each of said screen plugs has at least two pairs of screen cavities.

8. The filtering device according to claim 7, wherein each pair of screen cavities is two screen cavities arranged on diametrically facing sides of one of said screen plugs.

9. The filtering device according to claim 1, wherein said inlet zone of said screen plug outlet channel is arranged off center of said outlet end of said funnel section.

10. The filtering device according to claim 1, wherein said first central flank delimits said inlet zone with respect to said funnel section.

11. The filtering device according to claim 10, wherein said first central flank extends from a central tip of said funnel section to a junction with said second flank.

12. The filtering device according to claim 11, wherein said outlet zone extends, along a direction parallel to said center axis of said screen plug, at least from a radial center line passing through said central tip of said funnel section to a radial peripheral line passing through a periphery of said funnel section adjacent said clean side of said filter element, wherein said radial peripheral line is parallel to said radial center line and radially aligns with said direction parallel to said center axis of said screen plug.

13. The filter device according to claim 1, wherein said deflection point is defined by a portion of the body of the screen plug, said portion of the body of the screen plug being disposed between and abutting at least a portion of said inlet zone and at least a portion of said outlet zone.

* * * * *